Sept. 27, 1955   W. E. LEWIS   2,718,944
REVERSIBLE ROTARY HYDRAULIC COUPLING
Filed June 12, 1950   2 Sheets—Sheet 2
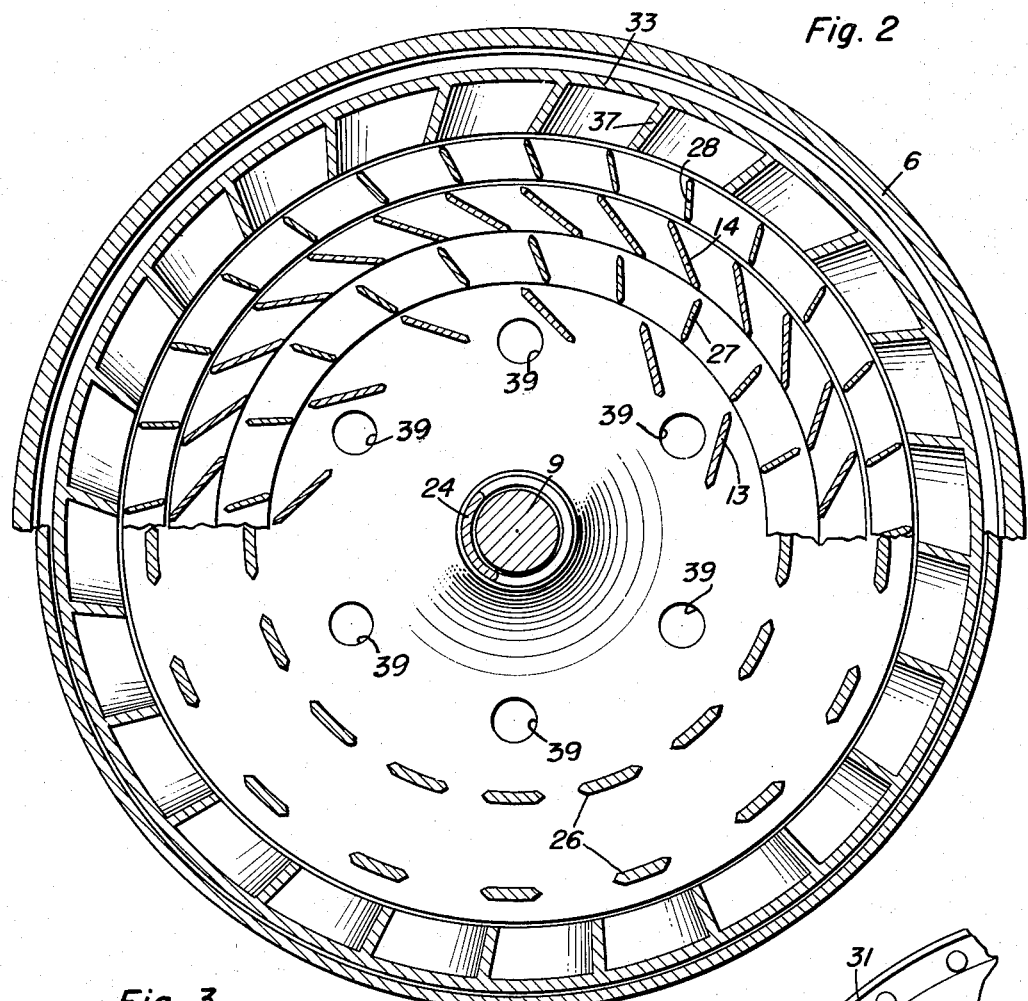
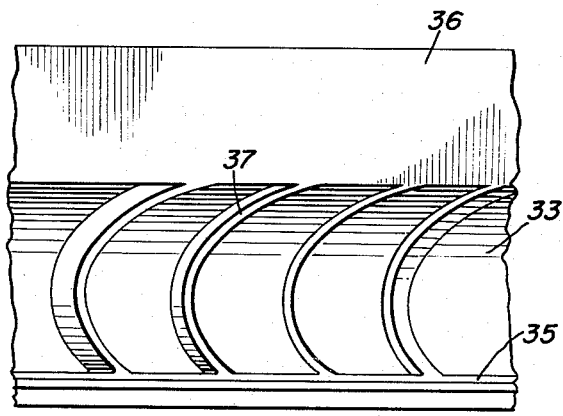
Warren E. Lewis
INVENTOR.

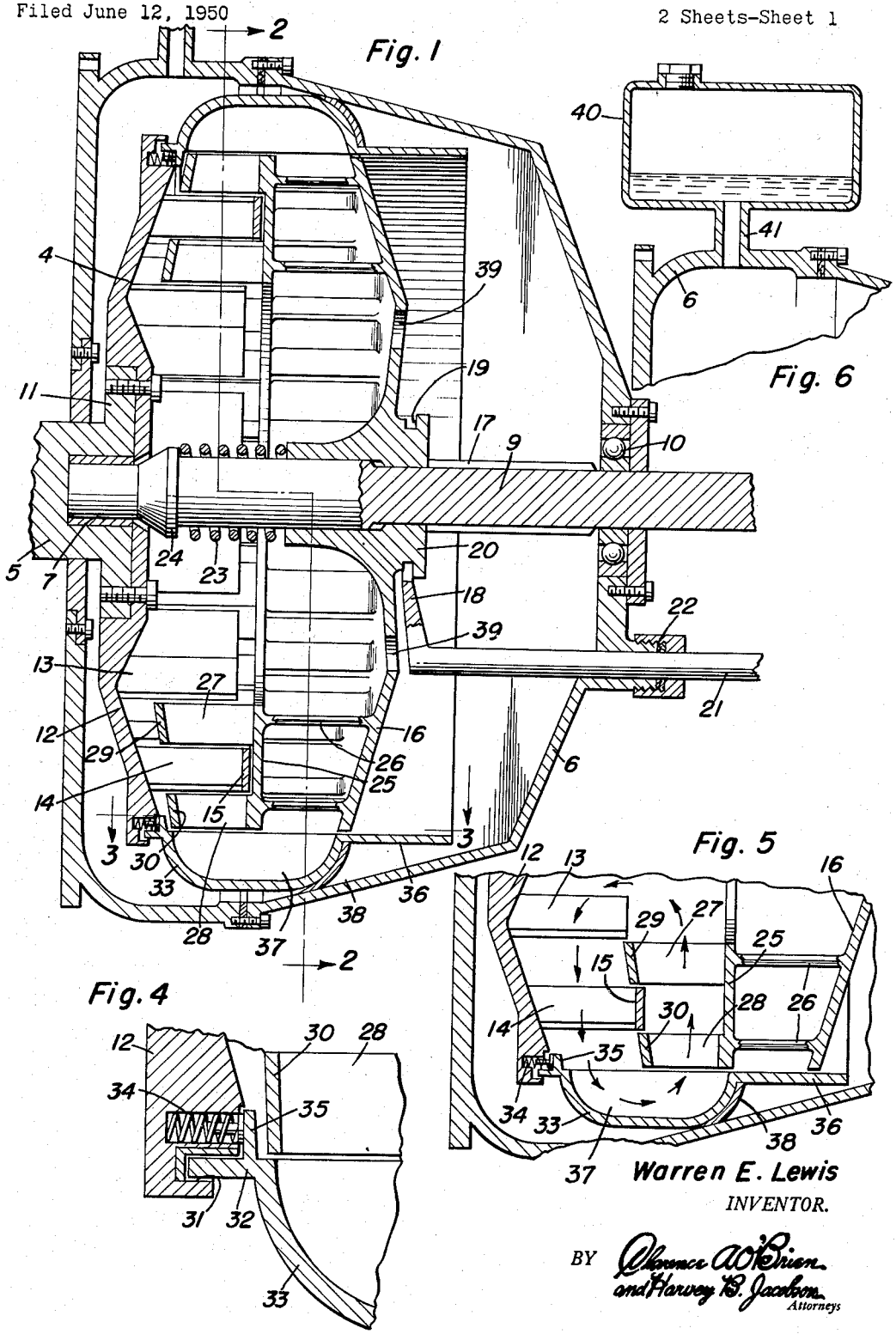

United States Patent Office 2,718,944
Patented Sept. 27, 1955

2,718,944

REVERSIBLE ROTARY HYDRAULIC COUPLING

Warren E. Lewis, Kankakee, Ill.

Application June 12, 1950, Serial No. 167,604

13 Claims. (Cl. 192—3.2)

The present invention relates to new and useful improvements in fluid transmissions for engines to provide a variable speed ratio between the engine and drive shaft and is designed particularly for use with motor driven vehicles.

An important object of the invention is to provide a fluid transmission including a drive impeller and a driven turbine member having a novel interfitting vane construction movable relative to each other to effect a forward or reverse drive.

Another object is to provide a reaction member at the periphery of the drive impeller and turbine member with braking means holding the same in a stationary position to effect a reverse drive, and actuated by a sliding movement of the turbine member to release the reversing member for rotation of the latter with the impeller and driven turbine member.

A further object is to provide the turbine member with a baffle ring and providing the vanes of the impeller and driven turbine with rings movable into and out of alignment with each other to produce a counter-flow for reversing the drive.

A still further object is to provide a device of this character of simple and practical construction, which is efficient and reliable in operation, relatively inexpensive to manufacture and otherwise well adapted for the purpose for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a longitudinal sectional view of the fluid transmission unit;

Figure 2 is a transverse sectional view taken on a line 2—2 of Figure 1;

Figure 3 is an enlarged fragmentary sectional view of the reaction member taken on a line 3—3 of Figure 1;

Figure 4 is an enlarged fragmentary sectional view showing the spring means holding the reaction member stationary;

Figure 5 is a fragmentary sectional view showing the reversing member in reversing position;

Figure 6 is a fragmentary sectional view showing the expansion reservoir, and

Figure 7 is a fragmentary elevational view of the drive impeller showing the recesses for the turbine springs.

Referring now to the drawings in detail wherein for the purpose of illustration I have disclosed a preferred embodiment of my invention, the numeral 5 designates the rear end of a crank shtaft of a power plant (not shown) and is positioned in one side of a housing 6 for the fluid transmission. The inner end of shaft 5 is formed with a recess 7 in which the inner end of a driven shaft 9 is journaled and supported. The driven shaft 9 is also journaled and supported in an opposite side of the housing in a ball bearing assembly 10.

The inner end of crank shaft 5 is formed with a flange 11 to which a drive impeller 12 of the fluid transmission unit, designated generally at 4, is secured, the drive impeller comprising a disk concaved on its inner side and having an inner circumferentially arranged group of vanes 13 and an outer circumferentially arranged group of vanes 14 projecting from the inner face of impeller 12. The outer group of vanes 14 are connected to each other by a ring 15 at the outer ends of the vanes.

A driven turbine member 16 also constructed of a disk having a concaved inner face is slidable on shaft 9 and connected thereto by splines 17 for rotation therewith and is controlled by a fork or yoke 18 engaged in an annular groove 19 in an external hub 20 on impeller 16. An actuating rod 21 extends from yoke 18 outwardly through a packing 22 in housing 6 and is actuated preferably by a conventional type vacuum unit (not shown) from the engine to slide turbine member 16 toward and away from impeller 12 and a coil spring 23 abutting a flange 24 on shaft 9 holds turbine member 16 away from impeller 12.

Driven turbine member 16 is provided at its inner face with a baffle ring 25 supported in spaced relation from the turbine disk by arms 26 and inner and outer circumferential groups of vanes 27 and 28 project from ring 25, the vanes 27 projecting between the vanes 13 and 14 of impeller disk 12 and vanes 28 being positioned circumferentially outwardly of vanes 14. The inner ends of vanes 27 and 28 are provided with rings 29 and 30, respectively.

The inner face of impeller disk 12 adjacent its periphery is formed with an annular groove 31 in which is slidably positioned an annular flange 32 at one side of a trough-shaped annular reaction member 33.

Coil springs 34 are recessed in the inner face of impeller disk 12 bearing against the outer side of a radially inwardly projecting flange 35 on reaction member 33, while the inner side of flange 35 is engageable by ring 30 of vanes 28, when turbine 16 is moved inwardly.

Reaction member 33 closes the peripheral edge of the fluid transmission unit formed by impellers 12 and 16 and an annular flange 36 projects from the side of reaction member 33 opposite from flange 32 and in which turbine member 16 slides. Internal vanes 37 are formed transversely in reaction member 33 and are curved, as shown more clearly in Figure 3.

A stationary brake ring 38, of suitable braking material is fixed in housing 6 outwardly of reaction member 33 and at its side opposite from springs 34, the latter holding the reaction member stationary in engagement with the brake ring, when released by ring 30 of turbine 16.

In the operation of the device a suitable type of oil or other fluid is placed in housing 6 from which the fluid enters the transmission unit 4 through openings 39 in turbine member 16. A fluid expansion reservoir 40 is connected to the top of housing 6 by a flexible tube or other conduit 41.

Impeller 12 is constantly driven by crankshaft 5, while turbine 16 is moved toward and aawy from impeller 12 by control rod 21. Figure 1 shows the forward position of the turbine 16. Spring 23 pushes turbine 16 rearwardly when the motor idles and a suitable vacuum unit pulls it forward when the speed of the motor increases.

Forward movement of turbine 16 moves ring 30 in engagement with flange 35 to release reaction member 33 from brake 38 and which is then free to move when in forward position and is held in driving engagement with impeller 12 and turbine 16.

In this position the action of the fluid by the vanes 13 and 14 of impeller 12 on the vanes 27 and 28 of turbine 16 will drive the latter to thus connect shafts 5 and 9 in driving relation. The vanes are inclined at a proper angle, as shown in Figure 2, to effectively produce the fluid driving action.

In order to have a satisfactory reverse it is necessary to provide a stationary member to change the rotary movement of the fluid with respect to baffle ring 25 and rings 15, 29 and 30, from the movement shown by the arrows in Figure 1 to that shown by the arrows in Figure 5.

The movement of turbine 16 outwardly releases reaction member 33, which is then held stationary by brake ring 38, and also moves baffle ring 25 to a position at the outer edge of reaction member 33 and moves rings 15, 29 and 30 into substantial alignment as shown in Figure 5, and the flow circles the last named aligned rings to reverse the flow with respect to the vanes 27 and 28 and a reverse drive is thus accomplished.

The pressure of the fluid on the vanes 37 of stationary reaction member 33 plus the pressure of springs 34 holds the reaction member 33 firmly against brake ring 38.

The spacing, number and pitch of the driving vanes 13 and 14 can be varied to provide a difference in the amount of circulation and the hydraulic leverage advantage which the drive impeller has over the turbine, because the drive vanes have less surface and more pitch from a radial position than the driven vanes. This allows the motor to run faster and produce more torque by faster circulation.

In view of the foregoing description taken in conjunction with the accompanying drawings it is believed that a clear understanding of the device will be quite apparent to those skilled in this art. A more detailed description is accordingly deemed unnecessary.

It is to be understood, however that even though there is herein shown and described a preferred embodiment of the invention the same is susceptible to certain changes fully comprehended by the spirit of the invention as herein described and the scope of the appended claims.

Having described the invention, what is claimed as new is:

1. A fluid transmission comprising a housing containing a fluid, a drive shaft and a driven shaft jounaled in opposite sides of said housing, a drive impeller fixed to an inner end of said power shaft, a turbine member secured to said driven shaft for sliding movement thereon, said drive impeller and said turbine member including opposed disks having coacting fluid drive means, means for selectively positioning said turbine member relative to drive impeller, a reaction member carried at the peripheries of said drive impeller and said turbine member and closing a space between peripheries of said opposed disks, brake means carried by said housing, said reaction member being normally urged into engagement with said brake means by said drive impeller.

2. A fluid transmission comprising a housing containing a fluid, a drive shaft and a driven shaft journaled in opposite sides of said housing, a drive impeller fixed to an inner end of said drive shaft, a turbine member secured to said driven shaft for sliding movement thereon, said drive impeller and said turbine member including opposed disks having coacting fluid drive means, means for selectively positioning said turbine member relative to drive impeller, a reaction member carried at the peripheries of said drive impeller and said turbine member and closing a space between peripheries of said opposed disks, brake means carried by said housing, said reaction member being selectively movable from braking engagement with said brake means to clutched engagement with said drive impeller and said turbine member.

3. A fluid transmission comprising a housing containing a fluid, a drive shaft and a driven shaft journaled in opposite sides of said housing, a drive impeller fixed to an inner end of said drive shaft, a turbine member secured to said driven shaft for sliding movement thereon, said drive impeller and said turbine member including opposed disks having coacting fluid drive means, means for selectively positioning said turbine member relative to drive impeller, a reaction member carried at the peripheries of said drive impeller and said turbine member and closing a space between peripheries of said opposed disks, brake means carried by said housing, said reaction member being normally urged into engagement with said brake means by said drive impeller, said turbine member being engageable with said reaction member to move said reaction member out of braking engagement with said brake means.

4. A fluid transmission comprising a housing containing a fluid, a drive shaft and a driven shaft journaled in opposite sides of said housing, a drive impeller fixed to an inner end of said drive shaft, a turbine member secured to said driven shaft for sliding movement thereon, said drive impeller and said turbine member including opposed disks having coacting fluid drive means, means for selectively positioning said turbine member relative to drive impeller, a reaction member carried at the peripheries of said drive impeller and said turbine member and closing a space between peripheries of said opposed disks, brake means carried by said housing, said reaction member including a flange adjacent the disk of said drive impeller, spring means carried by said drive impeller disk engaging said flange and urging said reaction member into braking engagement with said brake means.

5. A fluid transmission comprising a housing containing a fluid, a drive shaft and a driven shaft journaled in opposite sides of said housing, a drive impeller fixed to an inner end of said drive shaft, a turbine member secured to said driven shaft for sliding movement thereon, said drive impeller and said turbine member including opposed disks having coacting fluid drive means, means for selectively positioning said turbine member relative to drive impeller, a reaction member carried at the peripheries of said drive impeller and said turbine member and closing a space between peripheries of said opposed disks, brake means carried by said housing, said reaction member including a flange adjacent the disk of said drive impeller, said fluid drive means of said turbine member including a circumferential group of vanes having inner ends joined by a ring, said ring being disposable adjacent said drive impeller disk, said flange being disposed between said ring and said drive impeller disk for clutched engagement therebetween in response to movement of said turbine member towards said drive impeller.

6. A fluid transmission comprising a housing containing a fluid, a drive shaft and a driven shaft journaled in opposite sides of said housing, a drive impeller fixed to an inner end of said drive shaft, a turbine member secured to said driven shaft for sliding movement thereon, said drive impeller and said turbine member including opposed disks having coacting fluid drive means, means for selectively positioning said turbine member relative to drive impeller, a reaction member carried at the peripheries of said drive impeller and said turbine member and closing a space between peripheries of said opposed disks, brake means carried by said housing, said reaction member including a flange adjacent the disk of said drive impeller, spring means carried by said drive impeller disk engaging said flange and urging said reaction member into braking engagement with said brake means, said fluid drive means of said turbine member including a circumferential group of vanes having inner ends joined by a ring, said ring being disposable adjacent said drive impeller disk, said flange being disposed between said ring and said drive impeller disk for clutched engagement therebetween in response to movement of said turbine member towards said drive impeller, movement of said reaction member into clutched engagement between said drive impeller disk and said ring moving said reaction member out of braking engagement with said brake means.

7. A fluid transmission comprising a housing containing a fluid, a drive shaft and a driven shaft journaled in opposite sides of said housing, a drive impeller fixed to an inner end of said drive shaft, a turbine member secured to said driven shaft for sliding movement thereon, said drive impeller and said turbine member including opposed disks having coacting fluid drive means, means for selectively positioning said turbine member relative to drive impeller, a reaction member carried at the peripheries of said drive impeller and said turbine member and closing a space between peripheries of said opposed disks, brake means carried by said housing, said reaction member being normally urged into engagement with said brake means by said drive impeller, said reaction member being supported between and by said drive impeller and said brake means when in braking engagement with said brake means.

8. A fluid transmission comprising a housing containing a fluid, a drive shaft and a driven shaft journaled in opposite sides of said housing, a drive impeller fixed to an inner end of said drive shaft, a turbine member secured to said driven shaft for sliding movement thereon, said drive impeller and said turbine member including opposed disks having coacting fluid drive means, means for selectively positioning said turbine member relative to drive impeller, a reaction member carried at the peripheries of said drive impeller and said turbine member and closing a space between peripheries of said opposed disks, brake means carried by said housing, said reaction member including a flange adjacent the disk of said drive impeller, said fluid drive means of said turbine member including a circumferential group of vanes having inner ends joined by a ring, said ring being disposable adjacent said drive impeller disk, said flange being disposed between said ring and said drive impeller disk for clutched engagement therebetween in response to movement of said turbine member towards said drive impeller, said reaction member being supported by said drive impeller and said turbine member when in clutched engagement with said drive impeller disk and said ring.

9. A fluid transmission comprising a housing containing a fluid, a drive shaft and a driven shaft journaled in opposite sides of said housing, a drive impeller fixed to an inner end of said drive shaft, a turbine member secured to said driven shaft for sliding movement thereon, said drive impeller and said turbine member including opposed disks having coacting fluid drive means, means for selectively positioning said turbine member relative to drive impeller, a reaction member carried at the peripheries of said drive impeller and said turbine member and closing a space between peripheries of said opposed disks, brake means carried by said housing, and vanes on said reaction member in the path of said fluid urging said reaction member into engagement with said brake means.

10. In a fluid transmission, the combination of a power operated drive impeller and a turbine member slidable relative to said drive impeller, said drive impeller and said turbine member including opposed disks, a reaction member carried at the peripheries of said disk and closing the space therebetween to form a hollow chamber adapted to contain a liquid, concentric rows of vanes on opposed faces of said disks movable into and out of overlapping position relative to each other, and means carried by said vanes forming a passage to direct counterflowing liquid from said reaction member against vanes of said turbine member upon a predetermined sliding movement of said turbine member.

11. In a fluid transmission, the combination of a power operated drive impeller and a turbine member slidable relative to said drive impeller, said drive impeller and said turbine member including opposed disks, a reaction member carried at the peripheries of said disk and closing the space therebetween to form a hollow chamber adapted to contain a liquid, concentric rows of vanes on opposed faces of said disks movable into and out of overlapping position relative to each other, and rings carried by said vanes at their inner ends forming a passage to direct counterflowing liquid from said reaction member against vanes of said turbine member upon a predetermined sliding movement of said turbine member, said rings at inner ends of said vanes being aligned to form a partition directing counterflowing liquid from said reaction member against vanes of said turbine member upon a predetermined sliding movement of said turbine member.

12. In a fluid transmission, the combination of a power operated drive impeller and a turbine member slidable relative to said drive impeller, said drive impeller and said turbine member including opposed disks, a reaction member carried at the peripheries of said disk and closing the space therebetween to form a hollow chamber adapted to contain a liquid, an annular baffle plate carried by said turbine member disk in spaced relation thereto, concentric rows of vanes on opposed faces of said drive impeller disk and said baffle plate movable into and out of overlapping position relative to each other, said vanes, said reaction member and said baffle plate cooperating to effect a recirculatory flow of liquid.

13. In a fluid transmission, the combination of a power operated drive impeller and a turbine member slidable relative to said drive impeller, said drive impeller and said turbine member including opposed disks, a reaction member carried at the peripheries of said disk and closing the space therebetween to form a hollow chamber adapted to contain a liquid, an annular baffle plate carried by said turbine member disk in spaced relation thereto, concentric rows of vanes on opposed faces of said drive impeller disk and said baffle plate movable into and out of overlapping position relative to each other, said vanes, and means carried by said vanes cooperating with said baffle plate to form a passage directing counterflowing liquid from said reaction member against vanes of said turbine member upon a predetermined sliding movement of said turbine member.

References Cited in the file of this patent

UNITED STATES PATENTS

| 975,795 | Radcliffe | Nov. 15, 1910 |
| 1,298,990 | Mason | Apr. 1, 1919 |
| 1,773,985 | Fraser | Aug. 26, 1930 |
| 2,266,085 | Sanderson | Dec. 16, 1941 |
| 2,387,398 | Hruska et al. | Oct. 23, 1945 |
| 2,387,415 | Sibert | Oct. 23, 1945 |
| 2,398,665 | Pietsch | Apr. 16, 1946 |
| 2,627,954 | Lewis | Feb. 10, 1953 |

FOREIGN PATENTS

| 399,443 | France | Apr. 22, 1909 |